United States Patent [19]

Bott et al.

[11] Patent Number: 5,741,871
[45] Date of Patent: Apr. 21, 1998

[54] ACRYLIC EMULSIONS PREPARED IN THE PRESENCE OF FULLY HYDROLYZED POLY (VINYL ALCOHOL)

[75] Inventors: Richard Henry Bott; Frank Vito DiStefano, both of Macungie, Pa.

[73] Assignee: Air Products and Chemicals, Inc., Allentown, Pa.

[21] Appl. No.: 663,496

[22] Filed: Jun. 14, 1996

[51] Int. Cl.$^6$ .............. C08F 2/22; C08F 2/38; C08F 20/18
[52] U.S. Cl. .............................. 526/202; 524/459
[58] Field of Search .................. 524/459; 526/202

[56] References Cited

U.S. PATENT DOCUMENTS

| | | | |
|---|---|---|---|
| 2,318,429 | 5/1943 | Smith | 524/460 |
| 2,407,107 | 9/1946 | Smith | 524/459 |
| 2,773,050 | 12/1956 | Caldwell et al. | 524/459 |
| 4,670,505 | 6/1987 | Craig | 524/704 |
| 5,231,145 | 7/1993 | Brueckmann et al. | 525/369 |
| 5,240,771 | 8/1993 | Brueckmann et al. | 428/395 |
| 5,326,809 | 7/1994 | Bott et al. | 524/459 |
| 5,354,803 | 10/1994 | Dragner et al. | 524/503 |
| 5,364,904 | 11/1994 | Farmer et al. | 524/832 |

FOREIGN PATENT DOCUMENTS

| | | | |
|---|---|---|---|
| 0185607 | 7/1992 | European Pat. Off. | 526/202 |
| 0538571 | 8/1992 | European Pat. Off. | |
| 0718314 | 6/1996 | European Pat. Off. | |
| 0723975 | 7/1996 | European Pat. Off. | |
| 0185606 | 7/1992 | Japan | 526/202 |
| 7130914 | 10/1996 | Japan | |
| 1438449 | 6/1976 | United Kingdom | |

OTHER PUBLICATIONS

Farmer, D.B., in "Polyvinyl Alcohol–Developments", C. A. Finch ed. John Wiley & Sons, New York, NY p. 459 1992.

*Primary Examiner*—Peter A. Szekely
*Attorney, Agent, or Firm*—Russell L. Brewer

[57] ABSTRACT

This invention is an emulsion composition comprised of acrylic ester monomers polymerized in the presence of fully hydrolyzed poly(vinyl alcohol) or a partially hydrolyzed poly(vinyl alcohol) provided the molecular weight of the low molecular weight poly(vinyl alcohol) is from 5,000 to 13,000 as the only stabilizer and a chain transfer agent. The improvement over the known prior art is the ability to incorporate fully hydrolyzed poly(vinyl alcohol) without the need for other surfactants or special processing.

18 Claims, No Drawings

5,741,871

ACRYLIC EMULSIONS PREPARED IN THE PRESENCE OF FULLY HYDROLYZED POLY (VINYL ALCOHOL)

TECHNICAL FIELD OF THE INVENTION

This invention relates to a process for preparing stable emulsions of polyacrylates in the presence of poly(vinyl alcohol) and to the resulting emulsion.

BACKGROUND OF THE INVENTION

Poly(vinyl alcohol) is a widely used stabilizer for the emulsion polymerization of many vinyl ester monomers. The use of poly(vinyl alcohol) as a stabilizer allows for particle size control, rheology and crosslinking characteristics which are valuable for applications such as adhesives, sealants, coatings and binders. One limitation has been the inability to prepare stable acrylic emulsions at relatively low stabilizer levels of poly(vinyl alcohol), e.g., less that 12% by weight of the acrylic monomer to be polymerized. Another limitation of poly(vinyl alcohol) has been the inability of the industry to expand the use of this as a stabilizer for acrylic emulsions having high solids, e.g., greater that 45% by weight. Many efforts have been made to overcome this limitation, and in doing so all have generally relied either on process or compositional changes.

The following patents and references comment on the use of poly(vinyl alcohol) as a stabilizer system for the emulsion polymerization of a monomer mixture consisting of monomers having acrylic unsaturation.

GB 1348449 and Farmer, D. B. in "Polyvinyl alcohol-Developments", C. A. Finch ed. John Wiley & Sons, New York, N.Y., (p. 459, 1992) disclose the preparation of acrylic emulsions using non ionic or anionic surface active agents. Poly(vinyl alcohol) by itself, is alleged as being unsuitable for producing a stable emulsion.

U.S. Pat. No. 5,326,809 discloses the use of poly(vinyl alcohol-co-vinyl amine) as a stabilizer for the emulsion polymerization of a wide range of ethylenically unsaturated monomers. A representative poly(vinyl alcohol-co-vinyl amine) stabilizer contained from 50 to 99 mole % poly(vinyl alcohol) and from 0.1 to 50% poly(vinyl amine). All of the examples where acrylic monomers were exclusively used showed the addition of surfactant to enhance emulsion stability. Some stability enhancement was achieved through the amine functionality. Also, the acrylic monomer was methyl acrylate which in itself is easier to stabilize with PVOH because of its greater water solubility.

U.S. Pat. No. 5,354,803 discloses the preparation of a surfactantless formaldehyde-free poly(vinyl alcohol) graft copolymer comprising from 12 to 35% of a fully hydrolyzed low molecular weight poly(vinyl alcohol). In that work, a high concentration (12–35% by weight) of poly(vinyl alcohol) was used to promote chemical grafting of the acrylic monomer to the poly(vinyl alcohol). In addition, the solids contents of the emulsions prepared were consistently less than 40% by weight.

U.S. Pat. No. 5,364,904 discloses the preparation of a copolymer emulsion for use as a sizing agent for glass fibers. The emulsion is formed by microfluidizing an emulsion containing an alkyl (-meth) acrylate monomer and stabilized with poly(vinyl alcohol). The poly(vinyl alcohol) preferably has a degree of hydrolysis of at least 70% although no criticality of the hydrolysis of the poly(vinyl alcohol) is stated. The examples show the addition of surfactant which undoubtedly promotes stability of the emulsion.

GB 1,438,449 disclose the use of poly(vinyl alcohol) containing acid or mercaptan groups as a means for stabilizing all acrylic emulsion compositions. In addition, this reference also point out the lack of utility in using conventional poly(vinyl alcohol) as the stabilizer for all acrylic emulsion compositions.

U.S. Pat. No. 4,670,505 discloses the use of low molecular weight amino alcohols as part of a stabilization system for emulsion polymerization of (meth)acrylic monomers in the presence of protective colloids and surfactants. Preparing acrylic systems without vinyl acetate present in an amount of at least 50% resulted in unstable systems when prepared in the presence of poly(vinyl alcohol).

U.S. Pat. No. 2,318,429 discloses a process for producing an aqueous dispersion of polymerized alkyl methacrylates, i.e., methylmethacrylate, and isobutyl acrylate using a partially saponified polyvinyl acetate as a dispersing agent. The patentee noted that aqueous dispersions of polyacrylates had been obtained with anionic surface active agents but these emulsions had limited utility as textile finishes because they are readily coagulated by cationic surface active agents, by polyvalent metal ions and by positively charged emulsions and dispersions. The patentees reported that colloidal systems could be prepared by polymerizing alkyl acrylates in the presence of a partially saponified polyvinyl acetate having a saponification number of from 40–130 and a viscosity of approximately 20 centipoises (4% aqueous solution as 20° C). Table 1 discloses the preparation of polymethylmethacrylate and the presence of partially saponified and completely saponified polyvinyl acetate. The patentee noted that the emulsions prepared with completely saponified polyvinyl acetate were unstable.

U.S. Pat. No. 2,407,107 discloses a process for producing stable dispersions of alkyl acrylate polymers by an emulsion polymerization process wherein the alkyl acrylate monomers are emulsified in an aqueous solution and polymerized. A water soluble, partially saponified polyvinyl acetate is used as the emulsifying agent and is accompanied with a small amount of a petroleum hydrocarbon such as a mineral oil or wax. The hydrocarbon is employed in an amount from about 0.5–5% based on the weight of alkyl acrylate monomer and is used for enhancing the stability of the emulsion which contains typically from 10–40% by weight of polymerized alkyl acrylate.

U.S. Pat. No. 2,773,050 discloses a process for polymerizing an acrylic ester while in admixture with a polymer containing hydroxyl radicals, e.g., poly(vinyl alcohol) which then can be hardened by treatment with a crosslinking agent. The polymerization is advantageously carried out by preparing a dispersion of acrylic ester in an aqueous solution of a vinyl polymer having hydroxyl radicals, e.g., poly(vinyl alcohol) and, optionally, an emulsifying agent, e.g., alkali metal salts of sulfated fatty alcohol. The weight ratio of acrylic resin to the poly(vinyl alcohol) and the emulsion ranges from about 80:20 to about 50:50 although preferably from 80:20 to 65:35.

SUMMARY OF THE INVENTION

This invention pertains to improved acrylic emulsion compositions and to an improved process for preparing an acrylic emulsion. The improvement for polymerizing water insoluble acrylic monomer systems resides in effecting the polymerization of the acrylic monomers in the presence of a stabilizer system consisting essentially of poly(vinyl alcohol) having specified hydrolysis levels and in the presence of a chain transfer agent. This medium allows for the preparation of emulsions with useful properties and suited for use in applications such as adhesives, coatings, binders and cement additives. It has been found that it is possible to polymerize a substantially all acrylic, water insoluble monomer system wherein at least a majority of the acrylic monomer has a carbon content greater than methyl acrylate and stabilize that all acrylic emulsion system at high solids, greater than 45% by weight, at concentrations of less than 12% poly(vinyl alcohol) by weight of the emulsion using a stabilizer consisting essentially of poly(vinyl alcohol) selected from the group consisting of substantially fully hydrolyzed poly(vinyl alcohol) and a poly(vinyl alcohol) having a hydrolysis value of at least 86% and a number average molecular weight of from about 5,000 to 13,000. Hydrolysis levels of less than about 96.5% may be used in low molecular weight poly(vinyl alcohols) whereas higher molecular weight poly(vinyl alcohols) lead to instability.

There are several advantages associated with the invention and these include:

- an ability to produce high solids, essentially all acrylic emulsions using poly(vinyl alcohol) protective colloid as a stabilizer;
- an ability to produce acrylic emulsions having relatively low levels of poly(vinyl alcohol), e.g., from 2 to 12% and generally within a range of 3 to 5% by weight of the monomers;
- an ability to produce stable acrylic emulsions without the use of conventional surfactants or hydrocarbon solubilizers or microfluidization techniques;
- an ability to produce acrylic emulsions having excellent adhesion to a variety of substrates such as wood and having excellent wet strength and water resistance;
- an ability to form excellent films and coatings;
- an ability to produce redispersible acrylic polymers stabilized with poly(vinyl alcohol); and,
- an ability to produce acrylic emulsions having low viscosities.

DETAILED DESCRIPTION OF THE INVENTION

In the practice of this invention, substantially all acrylic emulsions can be produced by an emulsion polymerization process using a stabilizer system consisting of poly(vinyl alcohol) as the stabilizer. Acrylic monomers, particularly those acrylic monomers which have a water insolubility less than that of methyl acrylate, have been essentially impossible to polymerize in an emulsion system using poly(vinyl alcohol) as the stabilizer.

A wide range of acrylic monomers can be used in the polymerization process described herein and they may be used singly or in combination with other acrylic monomers. These ethylenically unsaturated polymerizable $C_1$–$C_8$ alkyl esters of acrylic and methacrylic acid include methylacrylate, ethylacrylate, butylacrylate, 2-ethyl-hexyl acrylate and the corresponding methacrylates. Of these methylmethacrylate and butylacrylate are the preferred lower alkyl acrylates used in the polymerization process for producing a variety of polymeric systems suited for adhesive, coating, binder and cementicious applications.

Other ethylenically unsaturated monomers may be copolymerized with the acrylic esters. The composition of the resultant copolymer is largely dependent upon the application. Typical monomers include vinyl acetate, acrylamide, methacrylamide, acrylic and methacrylic acid, maleic and fumaric anhydride, and so forth. The slightly more water soluble acrylates which include hydroxy acrylates, e.g., hydroxy ethyl acrylate and glycidyl acrylates may also be copolymerized with the acrylic esters. Monomers other than the acrylic esters should be kept to a minimum in order for the emulsion to be considered an acrylic emulsion, e.g., below about 10% and preferably below 5% by weight of the monomers employed in producing the polymer. The more hydrophilic monomers, i.e., monomers which are more hydrophilic than the acrylic monomers to be polymerized, should be avoided to maintain water resistant properties.

One of the keys to producing a high solids, e.g., greater than 45% by weight all acrylic emulsion without the use of surfactants, solubilizers, and microfluidization techniques resides in the use of a poly(vinyl alcohol) selected from the group consisting of substantially fully hydrolyzed poly(vinyl alcohol) and a partially hydrolyzed poly(vinyl alcohol), >86%, as the stabilizing agent where the number average molecular weight ranges from about 5,000 to 13,000. Low molecular weight poly(vinyl alcohols), i.e., below 13,000 may be used upwards from the 86% hydrolyzed to fully hydrolyzed. The level of poly(vinyl alcohol) utilized as a stabilizer is from about 2 to 12%, preferably from about 3 to about 7% based on the weight of the total monomers polymerized. One type of poly(vinyl alcohol) has a hydrolysis value of at least 96.5%, i.e., 96.5% of the acetate groups in poly(vinyl acetate) are converted to hydroxyl groups. When less than 96.5% of the acetate groups are converted to hydroxyl groups, i.e., the polyvinyl acetate is less than fully hydrolyzed, and the molecular weight is above about 13,000, there is a tendency for a high solids acrylic emulsion formulation to become gritty. As the degree of hydrolysis is reduced substantially below 96.5%, the latex may become unstable. A second type of poly(vinyl alcohol) is a poly(vinyl alcohol) having a hydrolysis value of at least 86% to fully hydrolyzed and a molecular weight within a range of from 5,000 to 13,000. Poly(vinyl alcohols) having lower hydrolysis values and high molecular weights may be acceptable for producing low solids acrylic emulsions as noted by the prior art but they are incapable of producing high solids emulsions at low poly(vinyl alcohol) stabilizer levels.

The molecular weight of the poly(vinyl alcohol) is an important factor in stabilizing the acrylic emulsion. A fully hydrolyzed poly(vinyl alcohol) having a number average molecular weight within a range of from about 5,000 to about 45,000 should be used with a preferred range of from about 15,000 to about 30,000. The lower hydrolysis value poly(vinyl alcohols) may be used provided the molecular weight does not exceed about 13,000.

Blends of fully hydrolyzed poly(vinyl alcohols) may be used with favorable results. One type of blend comprises from 20 to 80%, preferably 50 to 75%, of a low molecular weight (5,000 to 13,000) poly(vinyl alcohol), including 86 to 90% hydrolyzed, and 20 to 80%, preferably 50 to 75%, of a higher molecular weight, e.g., 25,000 to 45,000 molecular weight poly(vinyl alcohol). Another blend may comprise a fully hydrolyzed poly(vinyl alcohol) and a partially hydrolyzed poly(vinyl alcohol) which by itself would have been unacceptable for stabilizing the emulsion. In other words, not all of the stabilizing poly(vinyl alcohol) need be fully hydrolyzed but may contain some lower hydrolyzed material, e.g., a hydrolysis value of from 85 to 90% at a molecular weight greater than 15,000. If some lower hydrolysis material is employed, the level should be monitored closely as the emulsion will become less stable. One may use from about 0 to 25% of such lower hydrolysis poly(vinyl alcohol) but the remainder of the poly(vinyl alcohol) should have a hydrolysis value of at least 98% as the other component of the stabilizer.

Another of the keys in producing a stable lower alkyl acrylate containing emulsion lies in the use of a chain transfer agent. These chain transfer agents are incorporated in an amount of from about 0.2 to 3% and, preferably from 0.5 to 1.5%, by weight of the monomers to be polymerized. Representative chain transfer agents include conventional mercaptans such as n-dodecylmercaptan and water soluble chain transfer agents. Typically, these chain transfer agents should have a chain transfer coefficient of at least 0.6 based upon methylmethacrylate.

Emulsion polymerization of the lower alkyl esters of acrylic and methacrylic acid in the presence of poly(vinyl alcohol) and a chain transfer agent can be carried out using conventional delay addition polymerization techniques or by the conventional batch method. In the delay procedure, which is preferred, from about 10 to 30% of the monomers to be polymerized are added to the polymerization reactor containing a stabilizer and the balance of the monomers added over a period of time. The time for addition may vary but a conventional procedure will add the monomers over a period of from 2 to 4 hours. A further description is set forth in U.S. Pat. No. 5,326,809 and is incorporated by reference.

As in conventional emulsion polymerization processes the catalyst used is a free-radical forming catalyst such as a peroxide e.g. t-butyl hydroperoxide, persulfate such as potassium persulfate, ammonium persulfate and the like as well as azo compounds e.g. 2,2-'azo bis amidino propane hydrochloride and reducing systems such as sodium formaldehyde sulfoxylate and sodium erythrobate. The oxidizing agent is generally employed on an amount of from 0.01 to 1% preferably 0.05 to 0.5% based on the weight of the monomers introduced into the polymerization system. The reducing agent is added as an aqueous system and in the necessary equivalent or stoichiometric amount.

The particle size of the acrylic polymers and copolymers in the emulsion is in the range of 0.3 to 2 microns. This particle size range has advantages over the extreme fine particle size emulsions obtained through microfluidization. These advantages comprises stability under high shear, wet tack, setting speeds, stability to salts and wide formulation range offering latitude to formulators.

One of the significant advantages of the lower alkyl acrylate emulsions described herein is that they are stabilized with a stabilizing system consisting essentially of the fully hydrolyzed poly(vinyl alcohol) and/or partially hydrolyzed poly(vinyl alcohols), as described, do not contain levels of nonionic and anionic surfactants which may adversely affect the properties of the resulting polymer in many applications. Property advantages associated with the polymer in the presence of the fully hydrolyzed poly(vinyl alcohol) include those mentioned, supra, and desirable emulsion viscosity. Prior art emulsions having high levels of poly(vinyl alcohol) tend to have large levels of grafting which contributes to process disadvantages associated with undesirable viscosity, poor film formation and water resistance. The emulsions stabilized with lower levels of poly (vinyl alcohol) provide improvement in these properties.

The following examples are provided to illustrate various embodiments of the invention and are not intended to limit the scope thereof. All quantities are in parts by weight unless otherwise specified.

EXAMPLE 1

Hydrolysis of Poly(Vinyl Acetate)

The following method was used to determine the extent of hydrolysis of the poly(vinyl alcohol) samples used in the examples. A weighed sample of the poly(vinyl alcohol) was placed into a flask and dissolved in a 75/25 volume/volume mixture of water and methanol. An aliquot of sodium hydroxide solution of known concentration was then added in an amount sufficient to completely hydrolyze all remaining acetate groups. The solutions were then refluxed for one hour to insure complete reaction. Finally, the extent of hydrolysis was determined by back titration of excess sodium hydroxide with a standardized acid solution. The amount of sodium hydroxide consumed in completing the hydrolysis of the poly(vinyl alcohol) was then used to determine the hydrolysis extent of the poly(vinyl alcohol).

EXAMPLE 2

Preparation of Butyl Acrylate/Methylmethacrylate Emulsions In the Presence of Poly(Vinyl Alcohol)

General synthesis procedure: A 2 liter jacketed glass reactor equipped with a mixer, condenser, nitrogen purge and feeds for solution addition is used as the polymerization vessel. An aqueous system consisting of an initial charge which consists of water, stabilizing agent, oxidizing agent, a small level (10 to 30%) of monomer and promoter. This mixture is heated to reaction temperature and allowed to equilibrate at the desired temperature. The reaction then is initiated by addition of a small amount of reducing agent. When reaction begins to generate heat, addition of the feeds (delay addition) is commenced. The desired reaction temperature is maintained by heating or cooling the jacket of the reactor and by controlling the addition rate of the delay components. After all of the monomer and initiator solutions are added, the products are maintained at the reaction temperature for 30 to 90 minutes to insure complete conversion of monomer. The products were then cooled to room temperature and removed.

Emulsions, A through F, based upon butyl acrylate and methylmethacrylate were prepared in accordance utilizing the above general description. The examples, A through F, differed primarily through the use of various poly(vinyl alcohol) polymers as the stabilizer, such poly(vinyl alcohol) polymers being designated A–F to correspond to the different emulsions. Poly(vinyl alcohols) A–F are described in the following table.

| Poly(vinyl alcohol) | Poly(vinyl alcohol) Number Average Molecular Weight | Degree of Hydrolysis (mole %) |
| --- | --- | --- |
| A | 6,000 | 97.4 |
| B | 7,000–13,000 | 98–98.8 |
| C | 27,000–44,000 | 96.5–97.5 |
| D-comparative | 7,000–13,000 | 96.7 |
| E-comparative | 44,000–65,000 | 95.5–96.5 |
| F-comparative | 15,000–27,000 | 87–89 |
| G | 15,000–27,000 | 98–98.8 |

Emulsion (Poly(vinyl alcohol) A

This example illustrates the preparation of a butyl acrylate/methylmethacrylate copolymer emulsion prepared in the presence of poly(vinyl alcohol) A as the only stabilizer.

| Initial Charge to Reactor | |
| --- | --- |
| Deionized water | 230 gms |
| poly(vinyl alcohol) A 10% aqueous solution | 340 gms |
| Monomer mixture (same ratio as below) | 357 gms |
| tert butylhydroperoxide (70% aq soln) | 1.0 gms |
| Ferrous ammonium sulfate (1% aq soln) | 5 gms |
| acetic acid | 3.9 gms |

-continued

Delay Feeds

| Solutions | Amount |
|---|---|
| 1) Deionized water | 323.4 gms |
| Sodium formaldehyde sulfoxylate | 6.6 gms |
| Total | 330 gms |
| 2) Deionized water | 169.5 gms |
| tert butylhydroperoxide (70% aq soln) | 10.65 gms |
| Foamaster VF* | 1.5 |
| Total | 181.65 gms |
| 3) n-butyl acrylate | 383 gms |
| methylmethacrylate | 467 gms |
| n-dodecyl mercaptan | 7 gms |
| Total | 857 gms |

Foamaster VF is a commercial defoamer.

The reaction was conducted at 70° C. Delay solution 1 was added at a rate of 0.2 gm/min initially followed by an increase to 1.9 gm/min over a 2 hour period. Delay solution 2 was added at a rate of 0.1 gm/min initially then increased to 0.5 gm/min after 15 minutes. The monomer delay solution 3 was added at a rate of 3.3 gm/min. The reaction was complete in 4 hours. The product had the following properties.

| Unreacted Monomer butyl acrylate | 39 ppm |
|---|---|
| methylmethacrylate | 133 ppm |
| % Solids | 49.5 |
| Accelerated Sedimentation. | 4.0% |
| pH | 3.2 |
| Tg | 12.1° C. |
| 60 RPM Visc | 225 cps |
| 12 RPM Visc. | 420 cps |
| 100 mesh grits | 2500 ppm |

Viscosity measured on 4% emulsion, Brookfield instrument.

The emulsion was stable thus showing that high solids, butyl acrylate/methylmethacrylate emulsions could be prepared using poly(vinyl alcohol) as the only stabilizer. Grit levels were modest.

Emulsion (Poly(vinyl alcohol) B

This example illustrates the preparation of a butyl acrylate/methylmethacrylate copolymer emulsion prepared in the presence of poly(vinyl alcohol) B as having a hydrolysis value of 98% to 98.8%.

| Initial Charge to Reactor | |
|---|---|
| Deionized water | 230 gms |
| poly(vinyl alcohol) B 10% aqueous solution | 340 gms |
| Monomer mixture (same ratio as below) | 357 gms |
| tert butylhydroperoxide (70% aq soln) | 1.0 gms |
| Ferrous ammonium sulfate (1% aq soln) | 5 gms |
| acetic acid | 6.2 gms |

Delay Feeds

| Solutions | Amount |
|---|---|
| 1) Deionized water | 323.4 gms |
| Sodium formaldehyde sulfoxylate | 6.6 gms |
| Total | 330 gms |
| 2) Deionized water | 169.5 gms |
| tert butylhydroperoxide (70% aq soln) | 10.65 gms |
| Foamaster VF* | 1.5 |
| Total | 181.65 gms |
| 3) n-butyl acrylate | 383 gms |
| methylmethacrylate | 467 gms |
| n-dodecyl mercaptan | 7 gms |
| Total | 857 gms |

The reaction was conducted at 70° C. Delay solution 1 was added at a rate of 0.5 gm/min initially followed by an increase to 1.3 gm/min over a 1.5 hour period. Delay solution 2 was added at a rate of 0.3 gm/min initially then increased to 0.7 gm/min after 15 minutes. The monomer delay solution 3 was added at a rate of 3.7 gm/min. The reaction was complete in 4 hours. The product had the following properties.

| Unreacted Monomer butyl acrylate | 80 ppm |
|---|---|
| methylmethacrylate | 140 ppm |
| % Solids | 49 |
| pH | 3.1 |
| Tg | 20.9° C. |
| 12 RPM Visc | ND |
| 60 RPM Visc | 265 cps |
| 100 mesh grits | 100 ppm |
| Accelerated Sedimentation. | 3.0% |

The emulsion was stable and had few grits thus showing the effectiveness of the poly(vinyl alcohol) B as a stabilizer. It is believed the higher molecular weight poly(vinyl alcohol), i.e., 7000 to 13,000, as compared to that of poly(vinyl alcohol) A, is the main cause for the decreased grit level. That result is believed due to greater stabilizing forces within the higher molecular weight alcohol.

Emulsion (Poly(vinyl alcohol) C

This example demonstrates the preparation of a butyl acrylate/methylmethacrylate copolymer emulsion in the presence of poly(vinyl alcohol) C (96.5 to 97.5% hydrolysis) as the only stabilizer.

| Initial Charge to Reactor | |
|---|---|
| Deionized water | 230 gms |
| Poly(vinyl alcohol) C 10% aqueous solution | 340 gms |
| Monomer mixture (same ratio as below) | 357 gms |
| Tert butylhydroperoxide (70% aq soln) | 1.0 gms |
| Ferrous ammonium sulfate (1% aq soln) | 5 gms |
| Acetic acid | 3.1 gms |

Delay Feeds

| Solution | Amount |
|---|---|
| 1) Deionized water | 323.4 gms |
| Sodium formaldehyde sulfoxylate | 6.6 gms |
| Total | 330 gms |
| 2) Deionized water | 169.5 gms |
| tert-butylhydroperoxide (70% aq soln) | 10.65 gms |
| Foamaster VF* | 1.5 |
| Total | 181.65 gms |
| 3) n-butyl acrylate | 383 gms |
| methylmethacrylate | 467 gms |
| n-dodecyl mercaptan | 7 gms |
| Total | 857 gms |

The reaction was conducted at 70° C. Delay solution 1 was added at a rate of 0.2 gm/min initially followed by an increase to 1.2 gm/min over a 2-hour period. Delay solution 2 was added at a rate of 0.1 gm/min initially then increased to 0.7 gm/min over 30 minutes. The monomer delay solution 3 was added at a rate of 3.6 gm/min. The reaction was complete in 4 hours. The product had the following properties.

| Unreacted Monomer butyl acrylate | 49 ppm |
|---|---|
| methylmethacrylate* | ND |
| % Solids | 50.3 |
| pH | 4.0 |
| Tg | 22° C. |
| 12 RPM Visc | 19000 cps |

| | |
|---|---|
| 60 RPM Visc | 7980 cps |
| Accelerated Sedimentation | 7.0% |
| 100 mesh grits | 1900 ppm |

ND = not detected

The results show that the poly(vinyl alcohol) was effective for stabilizing the acrylic monomer system. However, as compared to poly(vinyl alcohol) B there was higher viscosity and grit formation probably due to the lower hydrolysis values of the poly(vinyl alcohol).

Emulsion (Poly(vinyl alcohol) D

This example illustrates the preparation of a butyl acrylate/methylmethacrylate copolymer emulsion prepared in the presence of poly(vinyl alcohol) D having a hydrolysis of 96.7% as the only stabilizer.

| Initial Charge to Reactor | |
|---|---|
| Deionized water | 230 gms |
| Poly(vinyl alcohol) D 10% aqueous solution | 340 gms |
| Monomer mixture (same ratio as below) | 357 gms |
| Tert butylhydroperoxide (70% aq soln) | 1.0 gms |
| Ferrous ammonium sulfate (1% aq soln) | 5 gms |
| Acetic acid | 4.8 gms |

| Delay Feeds | |
|---|---|
| Solution | Amount |
| 1) Deionized water | 323.4 gms |
| Sodium formaldehyde sulfoxylate | 6.6 gms |
| Total | 330 gms |
| 2) Deionized water | 169.5 gms |
| tert-butylhydroperoxide (70% aq soln) | 10.65 gms |
| Foamaster VF* | 1.5 |
| Total | 181.65 gms |
| 3) n-butyl acrylate | 383 gms |
| methylmethacrylate | 467 gms |
| n-dodecyl mercaptan | 7 gms |
| Total | 857 gms |

The reaction was conducted at 70° C. Delay solution 1 was added at a rate of 0.2 gm/min initially followed by an increase to 1.9 gm/min over a 2 hour period. Delay solution 2 was added at a rate of 0.1 gm/min initially then increased to 0.6 gm/min after 15 minutes. The monomer delay solution 3 was added at a rate of 3.3 gm/min. Large amounts of coagulum were observed immediately upon initiation of the reaction. This instability persisted throughout the reaction. The reaction was complete in 4 hours. The product had the following properties.

| | |
|---|---|
| Unreacted Monomer butyl acrylate | 24 ppm |
| methylmethacrylate | 63 ppm |
| % Solids | ND |
| Accelerated Sedimentation | ND |
| pH | ND |
| Tg | ND |
| 12 RPM Visc | ND |
| 60 RPM Visc | ND |
| 100 mesh grits | ND |

ND—Not determined due to instability of the product.

As noted from the description, the polymer coagulated almost immediately and the lower hydrolysis value of the poly(vinyl alcohol) was believed to be the basis for the ineffectiveness of the poly(vinyl alcohol) as a stabilizer. The presence of chain transfer agent did not help. It is believed the results obtained here are somewhat spurious because the data can not be reconciled with other work. Please refer to Example 5 regarding the Test Summary. However, the poly(vinyl alcohol) employed is on the borderline of acceptable stabilizers and one may expect upsets.

Emulsion (Poly(vinyl alcohol) E

This example illustrates the preparation of a butyl acrylate/methylmethacrylate copolymer emulsion prepared in the presence of poly(vinyl alcohol) E as the only stabilizer.

| Initial Charge to Reactor | |
|---|---|
| Deionized water | 230 gms |
| Poly(vinyl alcohol) E 10% aqueous solution | 340 gms |
| Monomer mixture (same ratio as below) | 357 gms |
| Tert butylhydroperoxide (70% aq soln) | 1.0 gms |
| Ferrous ammonium sulfate (1% aq soln) | 5 gms |
| Acetic acid | 3.3 gms |

| Delay Feeds | |
|---|---|
| Solution | Amount |
| 1) Deionized water | 323.4 gms |
| Sodium formaldehyde sulfoxylate | 6.6 gms |
| 2) Deionized water | 169.5 gms |
| tert-butylhydroperoxide (70% aq soln) | 10.65 gms |
| Foamaster VF* | 1.5 |
| 3) n-butyl acrylate | 383 gms |
| methylmethacrylate | 467 gms |
| n-dodecyl mercaptan | 7 gms |

The reaction was conducted at 70° C. Delay solution 1 was added at a rate of 0.2 gm/min initially followed by an increase to 1.9 gm/min over a 2 hour period. Delay solution 2 was added at a rate of 0.1 gm/min initially then increased to 0.6 gm/min after 15 minutes. The monomer delay solution 3 was added at a rate of 3.3 gm/min. Large amounts of coagulum were observed immediately upon initiation of the reaction. This instability persisted throughout the reaction. The reaction was stopped after 2 hours. The product had the following properties.

| | |
|---|---|
| Unreacted Monomer butyl acrylate | 43 ppm |
| methylmethacrylate | 238 ppm |
| % Solids | 34% |
| Accelerated Sedimentation. | ND |
| pH | 2.7 |
| Tg | ND |
| 12 RPM Visc | ND |
| 60 RPM Visc | ND |
| 100 mesh grits | 49,000 ppm |

ND—Not determined due to instability of the product.

The ineffectiveness of the high molecular weight, low hydrolysis poly(vinyl alcohol) as the stabilizer confirms the results of prior investigators regarding the ability of poly (vinyl alcohol) to stabilize the more water insoluble acrylic monomers in the absence of other hydrophilic monomers and/or stabilizers.

Emulsion (Poly(vinyl alcohol) F

This example illustrates the preparation of a butyl acrylate/methylmethacrylate copolymer emulsion prepared in the presence of poly(vinyl alcohol) F as the only stabilizer.

| Initial Charge to Reactor | |
|---|---|
| Deionized water | 245 gms |
| Poly(vinyl alcohol) F 10% aqueous solution | 218 gms |
| Monomer mixture (same ratio as below) | 40 gms |

-continued

| | |
|---|---|
| Tert butylhydroperoxide (70% aq soln) | 0.5 gms |
| Ferrous ammonium sulfate (1% aq soln) | 5 gms |
| Acetic acid | 2.3 gms |

| Delay Feeds | |
|---|---|
| Solution | Amount |
| 1) Deionized water | 237.5 gms |
| Sodium formaldehyde sulfoxylate | 12.5 gms |
| Total | 250 gms |
| 2) Deionized water | 200 gms |
| tert-butylhydroperoxide (70% aq soln) | 8.0 gms |
| Total | 208 gms |
| 3) n butyl acrylate | 289 gms |
| methylmethacrylate | 193 gms |
| n dodecyl mercaptan | 1.5 gms |
| Total | 483.5 gms |

The reaction was conducted at 70° C. Delay solution 1 was added at a rate of 0.2 gm/min initially followed by an increase to 0.3 gm/min over a 2 hour period. Delay solution 2 was added at a rate of 0.1 gm/min initially then increased to 0.4 gm/min after 15 minutes. The monomer delay was added at a rate of 1.4 gm/min. Large amounts of coagulum were observed immediately upon initiation of the reaction. This instability persisted throughout the reaction. The reaction was complete in 6 hours. The product had the following properties.

| | |
|---|---|
| Unreacted Monomer butyl acrylate methylmethacrylate* | 172 ppm |
| % Solids | 39.5 |
| Accelerated Sedimentation. | ND |
| pH | 2.3 |
| Tg | -7.0 |
| 12 RPM Visc | ND |
| 60 RPM Visc | ND |
| 100 mesh grits | ND |

*Not detected
ND - Not determined due to instability of the product.

The product was unstable thus slowing the importance of using a poly(vinyl alcohol) having a hydrolysis value of at least 96.5%, even though the molecular weight of the poly(vinyl alcohol) was within a desirable range.

EXAMPLE 3

Batch Process For Producing Butyl Acrylate/Methylmethacrylate Emulsion

This example demonstrates the preparation of a butyl acrylate/methylmethacrylate copolymer emulsion prepared in the presence of poly(vinyl alcohol) B as the only stabilizer using a by a batch process as distinguished form the delay process used in Example 2.

| Initial Charge to reactor | |
|---|---|
| Deionized water | 140 gms |
| poly(vinyl alcohol) B 10% aqueous solution | 160 gms |
| methylmethacrylate | 158 gms |
| butyl acrylate | 141 gms |
| n dodecylmercaptan | 0.9 gms |
| tert butylhydroperoxide (70% aq soln) | 2.3 gms |
| Ferrous ammonium sulfate (1% aq soln) | 5 gms |
| Foamaster VF | 2.3 gms |

-continued

| Delay Feeds | |
|---|---|
| Solution | Amount |
| 1) Deionized water | 237.5 gms |
| Sodium formaldehyde sulfoxylate | 12.5 gms |
| Total | 250 |

The reaction was initiated at 40° C. and ramped to 70° C. over 1 hour. Delay solution 1 was added at a rate of 0.3 gm/min. The reaction temperature was controlled by variation of the rate of addition of delay solution 1. The reaction was complete in 2 hours. The product exhibited good stability throughout the process. The product had the following properties.

| | |
|---|---|
| Unreacted Monomer butyl acrylate methylmethacrylate* | 31 ppm |
| % Solids | 45.8 |
| Accelerated Sedimentation. | 4.0% |
| pH | — |
| 60 RPM Visc | — |
| Tg 1 | -3.3 |
| 12 RPM Visc | — |
| 100 mesh grits | — |

*Not detected

EXAMPLE 4

Preparation of Butyl Acrylate/Methylmethacrylate Emulsions In the Presence of Blend of Poly(Vinyl Alcohols)

This example demonstrates the preparation of a butyl acrylate/methylmethacrylate copolymer emulsion prepared in the presence of a mixture or blend of poly(vinyl alcohol) C and poly(vinyl alcohol) G as the stabilizer.

| Initial Charge to reactor | |
|---|---|
| Deionized water | 403 gms |
| poly(vinyl alcohol) C 10% aqueous solution | 619 gms |
| poly(vinyl alcohol) G 10% aqueous solution | 185 gms |
| Monomer mixture (same ratio as below) | 434 gms |
| tert butylhydroperoxide (70% aq soln) | 2.2 gms |
| Ferrous ammonium sulfate (5% aq soln) | 5 gms |
| acetic acid | 5.8 gms |

| Delay Feeds | |
|---|---|
| Solution | Amount |
| 1) Deionized water | 393.9 gms |
| Sodium formaldehyde sulfoxylate | 10.1 gms |
| Total | 404 gms |
| 2) Deionized water | 387 gms |
| tert butylhydroperoxide (70% aq soln) | 15.4 gms |
| Total | 402.4 gms |
| 3) n-butyl acrylate | 935 gms |
| methylmethacrylate | 935 gms |
| n-dodecyl mercaptan | 13.2 gms |
| Total | 1883.2 gms |

The reaction was conducted at 70° C. Delay solutions 1 and 2 were added at a rate of 0.3 gm/min initially followed by an increase to 1.7 gm/min over a 2 hour period. The monomer delay was added at a rate of 16.1 gm/min. The reaction was complete in 2.5 hours. Of the total amounts of delay solutions 1 and 2 shown above, the actual amounts used were delay solution 1, 105.1 gms and delay solution 2, 156.9 gms. Additional water was added to adjust the final solids content to ~50%. The product had the following properties.

| | |
|---|---|
| Unreacted Monomer, butyl acrylate methylmethacrylate* | 235 ppm |
| % Solids | 50.4 |
| Accelerated Sedimentation. | 3.0% |
| pH | 3.9 |
| 60 RPM Visc | 2400 cps |
| Tg 1 | 0.7° C. |
| 12 RPM Visc | 5400 cps |
| 100 mesh grits | 50 ppm |

*Not detected

This example indicates the good properties which can be achieved through the use of combinations of poly(vinyl alcohol) polymers with differing molecular weight and hydrolysis levels. Grit formation was less than with any of the poly(vinyl alcohol) types used singly.

EXAMPLE 5

Test Summary

A series of tests were conducted to determine the effectiveness of a wide variety of commercial poly(vinyl alcohols). The general procedure of Example 1 was followed. The poly(vinyl alcohols) are described in the following table.

| PVOH Tested | % Hydrolysis | Viscosity/Number avg. Molecular Weight | Effective in Acrylate stabilization |
|---|---|---|---|
| A-502 | 87–89 | 3.0–3.7/7,000–13,000 | Yes, high viscosity |
| A-203 | 87–89 | 3.0–4.5/7,000–15,000 | Yes |
| A-205 | 87–89 | 5.2–6.2/15,000–27,000 | No-gritty and high seds |
| A-523 | 87–89 | 23–27/44,000–65,000 | No-gritty and high seds |
| WS-42 | 96.5–97.5 | 14–17/27,000–44,000 | Yes |
| A-425 | 95.5–96.5 | 27–31/44,000–65,000 | No-gritty, high viscosity and high seds |
| A-103 | 98.0–98.8 | 3.5–4.5/7,000–15,000 | Yes |
| A-107 | 98.0–98.8 | 5.5–6.6/15,000–27,000 | Yes |
| A-321 | 98.0–98.8 | 16.5–20.5/27,000–44,000 | Yes |
| A-125 | 99.3+ | 28–32/44,000–65,000 | Yes |
| Run 1 | 97.6 | 2.6/6,000 | Yes |
| Run 2 | 97.2 | 2.4/5,000 | Yes |

A in the above table is an abbreviation for the trademark, Airvol, owned by Air Products and Chemicals, Inc. for its line of poly(vinyl alcohols). The number following in the grade designation. Seds is an abbreviation for sedimentation.

As can be gleaned from the table, the best results are obtained with the medium weight, high hydrolysis >98% poly(vinyl alcohols). The results also show that the low hydrolysis poly(vinyl alcohol) at the low molecular weight was effective in stabilizing the acrylic emulsion and is in contrast to poly(vinyl alcohol) D, supra.

COMPARATIVE EXAMPLE 1

In this specific example a butyl acrylate/methylmethacrylate copolymer emulsion was prepared in accordance with the procedure of Example using poly(vinyl alcohol) B as the only stabilizer, the difference being the omission of the chain transfer agent, dodecyl mercaptan. The polymerization was terminated after a few hours because of excessive grit formation and emulsion instability.

What is claimed is:

1. In a process for the emulsion polymerization of a monomer mixture consisting essentially of water insoluble, ethylenically unsaturated monomers having acrylic unsaturation comprising polymerizing said water insoluble, ethylenically unsaturated monomers having acrylic unsaturation in the presence of water and a stabilizer for producing an emulsion containing polyacrylic polymer, the improvement for producing an acrylic emulsion having a solids content of greater than 45% by weight without microfluidization which comprises:

a) effecting the polymerization in a polymerization zone utilizing a stabilizer consisting essentially of poly(vinyl alcohol) derived by the hydrolysis of polyvinyl acetate and selected from the group consisting of poly(vinyl alcohol) having a hydrolysis value of greater than 96.5% and a number average molecular weight of 5,000 to 45,000 and a poly(vinyl alcohol) having a hydrolysis value of at least 86% where the number average molecular weight is within a range of from about 5,000 to 13,000 and in the substantial absence of surfactants and solvents, said poly(vinyl alcohol) being present in an amount of from 2 to about 12% by weight of the monomers to be polymerized; and, b) effecting the polymerization in the presence of a chain transfer agent, said chain transfer agent incorporated in an amount of from 0.2 to 3% by weight of the monomers to be polymerized;

c) effecting polymerization of a monomer mixture of $C_{1-8}$ alkyl esters of acrylic or methacrylic acid monomers, the majority of the $C_{1-8}$ alkyl esters of acrylic or methacrylic acid monomers having a carbon content greater than methyl acrylate and less than 10% of ethylenically unsaturated monomers which are not $C_{1-8}$ alkyl esters of acrylic or methacrylic acid monomers, and, d) effecting polymerization such that the polyacrylic polymer in said emulsion has a particle size range from 0.3 to 2 microns.

2. The process of claim 1 wherein the poly(vinyl alcohol) is incorporated in the emulsion in an amount of from about 3 to about 7% by weight of the monomers polymerized.

3. The process of claim 2 wherein the polymerization is effected by delay addition of the acrylic monomer to the polymerization zone.

4. The process of claim 3 wherein the delay addition is effected by charging from 10 to 30% of the acrylic monomer to be polymerized as an initial charge to the polymerization zone and then adding the balance of the monomer over a period of time.

5. The process of claim 2 wherein the $C_{1-8}$ alkyl esters of acrylic or methacrylic acid monomers are selected from the group consisting of methylmethacrylate, ethylacrylate, ethylmethacrylate, butyl acrylate and 2-ethyl-hexyl acrylate and less than 5% of ethylenically unsaturated monomers which are not $C_{1-8}$ alkyl esters of acrylic or methacrylic acid monomers.

6. The process of claim 2 wherein the poly(vinyl alcohol) has a percent hydrolysis of at least 98%.

7. The process of claim 5 wherein the poly(vinyl alcohol) stabilizer is present as a blend comprising from 20 to 80% of a low molecular weight (5,000 to 13,000) poly(vinyl alcohol) and 20 to 80% of a higher molecular weight 25,000 to 45,00 poly(vinyl alcohol).

8. The process of claim 7 wherein the poly(vinyl alcohol) stabilizer is present in an amount of from 50 to 75% of a low molecular weight (5,000 to 13,000) poly(vinyl alcohol) and a hydrolysis value of from about 86 to 90% and 25 to 50% of a higher molecular weight 25,000 to 45,000 poly(vinyl alcohol).

9. In an aqueous emulsion consisting essentially of polymerized ethylenically unsaturated monomers having acrylic unsaturation for producing polyacrylic polymer the improvement which comprises:
  (a) said emulsion stabilized with a stabilizer consisting essentially of poly(vinyl alcohol) derived by the hydrolysis of polyvinyl acetate and selected from the group consisting of poly(vinyl alcohol) having a hydrolysis value of greater than 96.5% and a number average molecular weight from 5,000 to 45,000 and a poly(vinyl alcohol) having a hydrolysis value of at least 86% where the number average molecular weight is within a range of from about 5,000 to 13,000
  (b) said emulsion is substantially free of surfactants and solvents.
  (c) said emulsion having a solids content of at least 45% by weight of the emulsion
  (d) said poly(vinyl alcohol) being incorporated in an amount of from 2 to 12% by weight of the polyacrylic polymer,
  (e) said polyacrylic polymer consisting essentially of polymerized units of $C_{1-8}$ alkyl esters of acrylic and methacrylic acid monomer, the majority of said monomer having a carbon content greater than methyl acrylate, and,
  (f) said polyacrylic polymer in said emulsion having a particle size range from 0.3 to 2 microns.

10. The emulsion of claim 9 wherein the poly(vinyl alcohol) is incorporated in the emulsion in an amount of from 3 to 7% by weight of the monomers polymerized.

11. The emulsion of claim 10 wherein the chain transfer agent is a mercaptan.

12. The emulsion of claim 11 wherein the $C_{1-8}$ alkyl esters of acrylic and methacrylic acid are selected from the group consisting of methylmethacrylate, ethylacrylate, ethylmethacrylate, butyl acrylate, 2-ethyl-hexyl acrylate and less than 5% of ethylenically unsaturated monomers which are not $C_{1-8}$ alkyl esters of acrylic or methacrylic acid monomers.

13. The emulsion of claim 12 wherein the poly(vinyl alcohol) has a percent hydrolysis of at least 98%.

14. The emulsion of claim 12 wherein the poly(vinyl alcohol) stabilizer is present in an amount of from 20 to 80% of a poly(vinyl alcohol) having a number average molecular weight of 5000 to 13,000 and 20 to 80% of a poly(vinyl alcohol) having a number average molecular weight of 25,000 to 45,000.

15. The process emulsion of claim 13 wherein the poly(vinyl alcohol) stabilizer is present in an amount of from 50 to 75% of a poly(vinyl alcohol) having a number average molecular weight of 5000 to 13,000 and 25 to 50% of a poly(vinyl alcohol) having a number average molecular weight of 25,000 to 45,000.

16. The process of claim 2 wherein the monomer mixture consists essentially of $C_{1-8}$ alkyl esters of acrylic or methacrylic acid.

17. The emulsion of claim 10 wherein the monomer mixture of consists essentially of $C_{1-8}$ alkyl esters of acrylic or methacrylic acid.

18. The emulsion of claim 17 wherein the chain transfer agent is dodecyl mercaptan.

\* \* \* \* \*